United States Patent [19]

Wittmann et al.

[11] Patent Number: 5,061,745
[45] Date of Patent: Oct. 29, 1991

[54] FLAME-RETARDANT, HIGH-IMPACT POLYCARBONATE MOLDING COMPOUNDS

[75] Inventors: Dieter Wittmann, Cologne; Horst Peters, Leverkusen; Jochen Schoeps, Krefeld, all of Fed. Rep. of Germany; Hans-Jürgen Kress, Pittsburgh, Pa.; Josef Buekers, Krefeld; Karl-Heinz Ott, Leverkusen, both of Fed. Rep. of Germany

[73] Assignee: Bayer Aktiengesellschaft, Leverkusen, Fed. Rep. of Germany

[21] Appl. No.: 355,957

[22] Filed: May 23, 1989

[30] Foreign Application Priority Data

Jun. 4, 1988 [DE] Fed. Rep. of Germany ....... 3819081

[51] Int. Cl.$^5$ .................. C08K 5/51; C08K 5/521; C08K 5/529
[52] U.S. Cl. .................... 524/139; 524/140; 524/141; 524/143; 524/504; 524/537
[58] Field of Search ............ 524/139, 140, 141, 143, 524/504, 531

[56] References Cited

U.S. PATENT DOCUMENTS

| | | | |
|---|---|---|---|
| 4,381,359 | 4/1983 | Idel et al. | 524/117 |
| 4,649,168 | 3/1987 | Kress et al. | 524/405 |
| 4,692,488 | 9/1987 | Kress et al. | 524/139 |
| 4,766,165 | 8/1988 | Kress et al. | 524/140 |
| 4,880,875 | 11/1989 | Wassmuth et al. | 525/67 |
| 4,914,144 | 4/1990 | Muchlbach et al. | 524/139 |

FOREIGN PATENT DOCUMENTS

| | | |
|---|---|---|
| 1248661 | 1/1989 | Canada . |
| 0174493 | 3/1986 | European Pat. Off. . |
| 207359 | 1/1987 | European Pat. Off. . |
| 226922 | 7/1987 | European Pat. Off. . |
| 248308 | 12/1987 | European Pat. Off. . |
| 3430234 | 2/1986 | Fed. Rep. of Germany . |
| 3545609 | 6/1987 | Fed. Rep. of Germany . |
| 3628904 | 3/1988 | Fed. Rep. of Germany . |
| 3629546 | 3/1988 | Fed. Rep. of Germany . |

Primary Examiner—Kriellion S. Morgan
Attorney, Agent, or Firm—Joseph C. Gil; Aron Preis

[57] ABSTRACT

The invention relates to polycarbonate molding compounds consisting of halogen-free polycarbonates, graft polymers, phosphorus compounds, tetrafluoroethylene polymers and, optionally, copolymers and/or, optionally, other additives known per se and a process for their production.

20 Claims, No Drawings

FLAME-RETARDANT, HIGH-IMPACT POLYCARBONATE MOLDING COMPOUNDS

This invention relates to high-impact, flame-retardant, thermoplastic polycarbonate molding compounds consisting of A) 50 to 96.5 parts by weight, preferably 60 to 96 parts by weight and, more preferably, 70 to 95.5 parts by weight of one or more thermoplastic, halogen-free, aromatic polycarbonates based on diphenols corresponding to formula (II), B) 3.5 to 25 parts by weight, preferably 4 to 15 parts by weight and, more preferably, 4.5 to 10 parts by weight of one or more halogen-free graft polymers of B.1) 5 to 90 parts by weight, preferably 30 to 80 parts by weight, based on B., of a mixture of B.1.1) 50 to 95% by weight styrene, α-methyl styrene, nucleus-substituted styrene, methyl methacrylate or mixtures thereof and B.1.2) 50 to 5% by weight (meth)acrylonitrile, methyl methacrylate, n-butyl acrylate, t-butyl (meth)acrylate or mixtures thereof, on B.2) 95 to 10 parts by weight, preferably 70 to 20 parts by weight, based on B), of a rubber having a glass temperature $T_G$ of $\leq 10°$ C. and C) 0 to 40 parts by weight, preferably 1 to 30 parts by weight and, more preferably, 5 to 20 parts by weight of a halogen-free, thermoplastic copolymer of C.1) 50 to 95% by weight styrene, methyl styrene, nucleus-substituted styrene, methyl methacrylate or mixtures thereof and C.2) 50 to 5% by weight (meth)acrylonitrile, methyl methacrylate or mixtures thereof, the sum of the parts by weight of A)+B)+optionally C) having to amount to 100 parts by weight, and D) 1 to 20 parts by weight, preferably 2 to 15 parts by weight and, more preferably, 3 to 12 parts by weight, based on 100 parts by weight of A)+B)+optionally C), of a halogen-free phosphorus compound corresponding to formula (I)

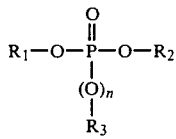

in which $R_1$, $R_2$ and $R_3$ independently of one another represent $C_1$-$C_8$ alkyl or optionally alkyl-substituted $C_6$-$C_{20}$ aryl and $n=0$ or 1, and E) 0.05 to 5 parts by weight, preferably 0.1 to 1 part by weight and, more preferably, 0.1 to 0.5 part by weight, based on 100 parts by weight of A)+B)+optionally C), of a tetrafluoroethylene polymer having average particle sizes of from 0.05 to 1000 μm, a density of 1.2 to 2.3 g/cm³ and a fluorine content of 65 to 76% by weight, component E) preferably being used in the form of a coagulated mixture of emulsions of the tetrafluoroethylene polymers E) having an average particle size of 0.05 to 20μ and a density of 1.2 to 1.9 g/cm³ with emulsions of graft polymers B) and the ratio by weight of graft polymer B) to the tetrafluoroethylene polymer E) being from 95:5 to 60:40 and the content of addition quantities B), based on 100 parts by weight A)+B) and optionally C), being from 0.1 to 4.0 parts by weight and, optionally, effective quantities of standard stabilizers, pigments, flow aids, fillers and reinforcing materials, mold release agents and/or antistatic agents.

DE-OS 3 322 260 (Le A 22 391) describes flame-retardant thermoplastic molding compounds of (a) 5 to 95 parts by weight polycarbonate, (b) 5 to 95 parts by weight SAN graft polymer, (c) 0 to 50 parts by weight of a thermoplastic polymer, (d) optionally 3 to 15 parts by weight per 100 parts by weight (a)+(b)+(c) of an organic halogen compound, (e) from 0.05 to 5 parts by weight per 100 parts by weight (a)+(b)+(c) of antimony trioxide, antimony carbonate, bismuth trioxide or bismuth carbonate, (f) from 0.05 to 0.5 part by weight per 100 parts by weight of the sum of (a) to (f) of finely divided tetrafluoroethylene polymer.

Where antimony trioxide or antimony carbonate is used and where the tetrafluoroethylene polymer is specially incorporated by co-precipitation with components (b) and, optionally, (c), flame-retardant moldings having a good surface are obtained, achieving a rating of V - O for a thickness of 1.6 mm where additional halogen is present either through component (a) or through components (d) (cf. EP-PS 0 131 751).

DE-OS 3 430 234 (Le A 22 925) describes flame-resistant thermoplastic polymer mixtures containing special, halogen-free polycarbonates of 50 mol % to 100 mol % tetraalkylated bisphenol carbonate structural units, halogen-free styrene polymers and/or halogen-free graft polymers, halogen-free phosphate esters and, optionally, tetrafluoroethylene polymers.

EP-OS 0 174 493 (Le A 23 043-EP) describes thermoplastic molding compounds consisting of A) 20 to 85 parts by weight of a thermoplastic aromatic polycarbonate, B) 5 to 50 parts by weight of a graft polymer of B.1) 5 to 90 parts by weight and preferably 30 to 80 parts by weight of a mixture of B.1.1) 50 to 95% by weight styrene, α-methyl styrene, nucleus-substituted styrene, methyl methacrylate or mixtures thereof and B.1.2) 50 to 5% by weight (meth)acrylonitrile, methyl methacrylate, maleic anhydride, N-substituted maleic imide or mixtures thereof, on B.2) 95 to 10 parts by weight and preferably 70 to 20 parts by weight of a rubber having a glass temperature $T_G$ of $\leq 10°$ C., C) 5 to 70 parts by weight of a thermoplastic copolymer of C.1) 50 to 95% by weight styrene, α-methyl styrene, nucleus-substituted styrene, methyl methacrylate or mixtures thereof and C.2) 50 to 5% by weight (meth)acrylonitrile, methyl methacrylate, maleic anhydride, N-substituted maleic imide or mixtures thereof and, optionally, D) 3 to 15 parts by weight of a low molecular weight or high molecular weight halogen compound, more especially a bromine compound, based on 100 parts by weight of A)+B)+C) and, optionally, D), the halogen content arising out of components A)+D) having to amount to between 3% by weight and 10% by weight, based on the total weight of components A)+D), characterized in that they additionally contain E) 1 to 15 parts by weight and preferably 2 to 12 parts by weight of a phosphorus compound corresponding to formula (I)

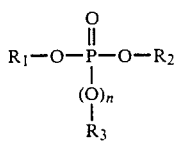

in which $R_1$, $R_2$ and $R_3$ independently of one another represent an optionally halogenated $C_1$-$C_8$ alkyl or an optionally halogenated $C_6$-$C_{20}$ aryl and $n=0$ or 1 and F) from 0.05 to 1 part by weight and more especially from 0.1 to 0.5 part by weight of a tetrafluoroethylene polymer having an average particle size of from 0.05 to 20 μm and a density of from 1.2 to 1.9 g/cm$^3$, the parts by weight of components E) and F) being based on 100 parts by weight of the sum of components A)+B)+C) and, optionally, D) and component F) being used in the form of a coagulated mixture of emulsions of the tetrafluoroethylene polymers F) with emulsions of additional quantities of graft polymers B) of at most 4 parts by weight, but at least 0.1 part by weight, based on 100 parts by weight of the sum of components A)+B)+C) and, optionally, D).

It was found that UL-94 ratings of V-O for a thickness of 1.6 mm were only obtained in the presence of component D) and/or where halogenated polycarbonate was used as component A).

It has now been found that, in contrast to the teaching of EP-OS 0 174 493, a UL-94 rating of V-O is achieved with the molding compounds according to the invention, even in the absence of halogen (Cl, Br) compounds. It had been expected that it would not be possible to achieve a rating of V-O for a thickness of 1.6 mm through the presence of additional graft polymers in addition to the quantity of 0.1 to 4 parts by weight present through the co-precipitation of Teflon.

DE-OS 3 521 388 (Le A 23 877) describes thermoplastic flame-resistant molding compounds containing halogen-free polycarbonates, copolymers of styrenes with maleic anhydride, phosph(on)ate esters, tetrafluoroethylene polymers and 0.1 to 3 parts by weight graft polymers, the graft polymers again having been co-precipitated with the tetrafluoroethylene polymers. Although these molding compounds achieve a V-O rating for a thickness of 1.6 mm, their toughness, flow line strength and resistance to stress crazing are inadequate for numerous applications.

DE-OS 3 523 314 (Le A 23 940) describes high-impact, flame-retardant molding compounds of halogen-free polycarbonates, halogen-free styrene-acrylonitrile copolymers, phosphorus compounds, tetrafluoroethylene polymers and 0.1 to 3 parts by weight graft polymers, the graft polymers again having been co-precipitated with the tetrafluoroethylene polymers.

However, the toughness, flow line strength and resistance to stress crazing of the molding compounds according to DE-OS 3 523 314 is inadequate for certain applications, particularly in the case of complicated, flame-proofed moldings, such as housing components, where design-related openings, webs and the like call for as high a level of the above-mentioned properties as possible.

DE-OS 3 545 609 (Le A 24 039) describes halogen-free; substantially non-inflammable molding compounds consisting of A) 40 to 95 parts by weight, based on 100 parts by weight A)+B)+C), of a thermoplastic, halogen-free aromatic polycarbonate, B) 5 to 30 parts by weight, based on 100 parts by weight of A)+B)+C), of a halogen-free "ABS" graft polymer obtainable from 20 to 90% by weight of a mixture of a) 95 to 50% by weight styrene, p-methyl styrene, α-methyl styrene or mixtures thereof and b) 5 to 50% by weight acrylonitrile and/or methacrylonitrile on 80 to 10% by weight of a diene rubber, C) 10 to 30 parts by weight, based on 100 parts by weight A)+B)+C), of a halogen-free, statistical copolymer of C.1) 5 to 30% by weight maleic anhydride and C.2) 95 to 70% by weight styrene, α-methyl styrene, nucleus-alkylated styrenes or mixtures of these styrenes, D) 1 to 20 parts by weight, based on 100 parts by weight of the total weight of A)+B)+C), of a halogen-free phosphorus compound corresponding to formula (I)

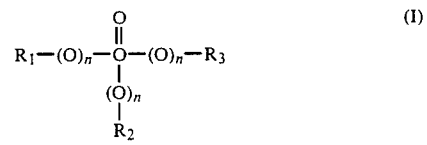

in which $R_1$, $R_2$ and $R_3$ independently of one another represent $C_1$-$C_8$ alkyl or optionally alkyl-substitute $C_6$-$C_{20}$ aryl and $n=0$ or 1; two of the indices n may also be 1 and the third 0, E) 0.05 to 5 parts by weight, based on 100 parts by weight of the total weight of A)+B)+C), of a tetrafluoroethylene polymer and, optionally, F) stabilizers, pigments, flow aids, mold release agents and/or antistatic agents.

However, molding compounds of the type in question have the disadvantage of a narrower processing scope and lower flow line strength than the molding compounds according to the invention.

DE-OS 3 628 904 (Le A 24 683) describes high-impact flame-retardant polycarbonate molding compounds consisting of A) 60 to 90 parts by weight of a halogen-free polydiorganosiloxane-polycarbonate block copolymer having an average molecular weight $\overline{M}_w$ of 10,000 to 200,000 and a content of aromatic carbonate structural units of 75 to 99% by weight and a content of diorganosiloxane units of 25 to 1.0% by weight, the block copolymers being produced from α,ω-bis-hydroxyaryloxy-terminated polydiorganosiloxanes with a degree of polymerization $P_n$ of from 5 to 100, B) 10 to 40 parts by weight of a halogen-free, thermoplastic copolymer of 50 to 95% by weight styrene, α-methyl styrene, nucleus-substituted styrene or mixtures thereof and 5 to 50% by weight (meth)acrylonitrile, C) 1 to 20 parts by weight, based on 100 parts by weight of the total weight of A) and B), of a halogen-free phosphorus compound corresponding to formula (I)

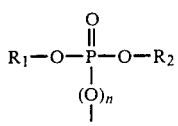

in which $R_1$, $R_2$ and $R_3$ independently of one another represent $C_1$–$C_8$ alkyl or optionally alkyl-substituted $C_6$–$C_{20}$ aryl and n=0 or 1, and D) 0.05 to 5 parts by weight, again based on 100 parts by weight of the total weight of A) and B), of a tetrafluoroethylene polymer having a density of 2.0 to 2.3 g/cm$^3$ and a particle size of 100 to 1000 μm.

DE-OS 3 629 546 (Le-A 24 695) describes high-impact flame-retardant molding compounds containing A) 60 to 90 parts by weight of a halogen-free polydiorganosiloxane-polycarbonate block copolymer having an average molecular weight $\overline{M}_w$ of 10,000 to 20,000 and a content of aromatic carbonate structural units of 75 to 99% by weight and a content of diorganosiloxane units of 25 to 1.0% by weight, the block copolymers being produced from α,ω-bis-hydroxyaryloxy-terminated polydiorganosiloxanes with a degree of polymerization $P_n$ of 5 to 100, B) 10 to 40 parts by weight of a halogen-free, thermoplastic copolymer of 50 to 95% by weight styrene, α-methyl styrene, nucleus-substituted styrene or mixtures thereof and 5 to 50% by weight (meth)acrylonitrile, C) 1 to 20 parts by weight, based on 100 parts by weight of the total weight of A) and B), of a halogen-free phosphorus compound corresponding to formula (I)

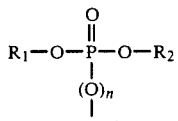

in which $R_1$, $R_2$ and $R_3$ independently of one another represent $C_1$–$C_8$ alkyl or optionally alkyl-substituted $C_6$–$C_{20}$ aryl and n=0 or 1 and D) 0.05 to 5 parts by weight, based on 100 parts by weight of the total weight of A) and B), of a tetrafluoroethylene polymer having average particle sizes of 0.05 to 20 μm and a density of 1.2 to 1.9 g/cm$^3$, component D) being used in the form of a coagulated mixture of emulsions of the tetrafluoroethylene polymers D) with emulsions of at most 3 parts by weight, but at least 0.1 part by weight, based on 100 parts by weight of the sum of components A) and B), of graft polymers E) of 5 to 90 parts by weight of a mixture of E.1.1) 50 to 95 parts by weight styrene, α-methyl styrene, nucleus-substituted styrene, methyl methacrylate or mixtures thereof and E.1.2) 50 to 5% by weight (meth)acrylonitrile, methyl methacrylate, maleic anhydride, N-substituted maleic imide or mixtures thereof, on E.2) 95 to 100 parts by weight of a rubber having a glass temperature $T_G$ of $\leq 10°$ C., and the ratio by weight of graft polymer E) to the tetrafluoroethylene polymer D) being from 95:5 to 60:40.

However, the molding compounds according to DE-OS 3 4 and DE-OS 3 629 546 show inadequate resistance to stress crazing.

The technical advantage of the molding compounds according to the invention lies in the extremely advantageous combination of toughness, resistance to stress crazing and flame resistance, the latter being achieved without any halogen (Br, Cl) and metal compounds.

Thermoplastic, halogen-free, aromatic polycarbonates of component A) suitable for use in accordance with the invention are those based on diphenols corresponding to formula (II)

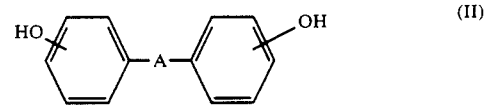

in which A is a single bond, $C_1$–$C_5$ alkylene, $C_2$–$C_5$ alkylidene, $C_5$–$C_6$ cycloalkylidene, —S— or —$SO_2$—.

Suitable diphenols corresponding to formula (II) are, for example, hydroquinone, resorcinol, 4,4'-dihydroxydiphenyl, 2,2-bis-(4-hydroxyphenyl)-propane, 2,4-bis-(4-hydroxyphenyl)-2-methyl butane or 1,1-bis-(4-hydroxyphenyl)cyclohexane.

Preferred diphenols corresponding to formula (II) are 2,2-bis-(4-hydroxyphenyl)-propane and 1,1-bis-(4-hydroxyphenyl)-cyclohexane.

The diphenols corresponding to formula (II) are either known from the literature or may be produced by methods known from the literature.

The production of the polycarbonates of component A) suitable for use in accordance with the invention is known from the literature and may be carried out, for example, with phosgene by the interfacial process or with phosgene by the homogeneous-phase process (so-called pyridine process), the particular molecular weight to be established being obtained in known manner through a corresponding quantity of known chain terminators. Suitable chain terminators are, for example, monophenols, such as phenol itself, p-cresol, p-tert.-butylphenol and p-isooctylphenol.

The polycarbonates of component A) suitable for use in accordance with the invention have average molecular weights ($\overline{M}_w$, as measured for example by ultracentrifugation or by scattered light measurement) of from 10,000 to 200,000 and preferably from 20,000 to 80,000.

The polycarbonates of component A) suitable for use in accordance with the invention are both homopolycarbonates and also copolycarbonates.

The polycarbonates of component A) suitable for use in accordance with the invention may be branched in known manner, preferably through the incorporation of 0.05 to 2.0 mol %, based on the sum of the diphenols used, of trifunctional or more than trifunctional compounds, for example those containing three or more than three phenolic OH groups.

In the context of the invention, "halogen-free polycarbonates" are understood to be polycarbonates of halogen-free diphenols, halogen-free chain terminators and, optionally, halogen-free branching agents, the content of small quantities (ppm) of hydrolyzable chlorine, resulting for example from the production of the polycarbonates with phosgene by the interfacial process, not counting as "halogen-containing" in the context of the invention. Polycarbonates such as these having ppm contents of hydrolyzable chlorine are halogen-free polycarbonates in the context of the invention.

Rubbers suitable for the production of the halogen-free graft polymers B) are, in particular, polybutadiene, butadiene/styrene copolymers (both also copolymerized with up to 30% by weight, based on the weight of the rubber, of a lower alkyl ester of acrylic or methacrylic acid, such as methyl methacrylate, ethyl acrylate, methyl acrylate or ethyl methacrylate), polyisoprene, alkyl acrylate rubbers (of $C_1-C_8$ alkyl acrylates, particularly ethyl, butyl, ethyl hexyl acrylate). The alkyl acrylate rubbers may optionally contain up to 30% by weight, based on the weight of the rubber, of such monomers as vinyl acetate, acrylonitrile, styrene, methyl methacrylate and/or vinyl ethers in copolymerized form and also relatively small quantities, preferably up to 5% by weight, based on the weight of the rubber, of crosslinking, ethylenically unsaturated monomers. Crosslinking agents such as these are, for example, alkylenediol di-(meth)-acrylates, polyester di-(meth)-acrylates, divinylbenzene, trivinylbenzene, triallyl cyanurate, allyl (meth)acrylate, butadiene or isoprene. Suitable acrylate rubbers are those which contain a crosslinked diene rubber of one or more conjugated dienes and, optionally, an ethylenically unsaturated monomer, such as styrene and/or acrylonitrile, as core. Other suitable rubbers are, for example, EPDM rubbers, i.e. rubbers of ethylene, propylene and an unconjugated diene, and also silicone rubbers.

Preferred rubbers for the production of the graft polymers B) are diene and alkyl acrylate rubbers.

The rubbers are present in the graft polymers B) in the form of at least partly crosslinked particles having an average particle size from 0.09 to 5 $\mu$m and more especially from 0.1 to 1 $\mu$m. The graft polymers B) are produced by radical graft copolymerization of the monomer mixtures defind at the beginning of B.1.1) and B.1.2) in the presence of the rubbers B.2) to be grafted and are all known. Preferred production processes for the graft polymers B) are emulsion, solution, bulk or suspension polymerization. Particularly preferred graft polymers B) are the so-called ABS polymers. Nucleus-substituted styrenes are understood to be nucleus-alkylated styrenes, such as for example p-methyl styrene.

Copolymers of component C) are often formed as secondary products in the graft polymerization for the production of component B), particularly when large quantities of monomers are grafted onto small quantities of rubber.

The quantity of copolymer C) to be used in accordance with the invention does not include these secondary graft polymerization products.

The copolymers of component C) are resin-like, thermoplastic and rubber-free. Particularly preferred copolymers C) are those of styrene with acrylonitrile and, optionally, with methyl methacrylate, of α-methyl styrene with acrylonitrile and, optionally, with methyl methacrylate or of styrene and α-methyl styrene with acrylonitrile and, optionally, with methyl methacrylate.

Particularly preferred ratios by weight in the thermoplastic copolymer C) are 60 to 80% by weight C.1) and 40 to 20% by weight C.2).

The styrene-acrylonitrile copolymers of component C) are known and may be produced by radical polymerization, more especially by emulsion, suspension, solution or bulk polymerization. The copolymers of component C) preferably have molecular weights M (weight average, as determined by light scattering or sedimentation) of from 15,000 to 200,000.

The halogen-free phosphorus compounds of component D) suitable for use in accordance with the invention are generally known (cf. for example Ullmann, Enzyklopädie der technischen Chemie, Vol. 18, pages 301 et seq., 1979; Houben-Weyl, Methoden der Organischen Chemie, Vol. 12/1, page 43; Beilstein, Vol. 6, page 177).

Phosphorus compounds of component D), formula (I), suitable for use in accordance with the invention are, for example, triphenylphosphate, tricresylphosphate, diphenyl-2-ethyl cresylphosphate, tri-(isopropylphenyl)-phosphate, methylphosphonic acid diphenyl ester, phenyl phosphonic acid diethyl ester, diphenyl cresylphosphate and tributylphosphate.

The tetrafluoroethylene polymers of component e) suitable for use in accordance with the invention are polymers having fluorine contents of from 65 to 76% by weight and preferably from 70 to 76% by weight. Examples of such polymers are polytetrafluoroethylene, tetrafluoroethylene-hexafluoropropylene copolymers or tetrafluoroethylene copolymers containing small quantities of fluorine-free, copolymerizable, ethylenically unsaturated monomers. The polymers are known and may be produced by known methods, for example by polymerization of tetrafluoroethylene in aqueous medium with a catalyst forming free radicals, for example sodium, potassium or ammonium peroxydisulfate, under pressures of 7 to 71 kg/cm$^2$ and at temperatures of from 0° to 200° C. and preferably at temperatures of 20° to 100° C. (For further particulars, cf. for example U.S. Pat. No. 2,393,967.) Depending on the form in which they are used, these materials may have a density of 1.2 to 2.3 g/cm$^3$ and an average particle size of 0.05 to 1000 $\mu$m.

According to the invention, preferred polytetrafluoroethylenes have average particle sizes from 0.05 to 20 $\mu$m and preferably from 0.08 to 10 $\mu$m and a density of from 1.2 to 1.9 g/cm$^3$ and are used in the form of a coagulated mixture of emulsions of the tetrafluoroethylene polymers E) with emulsions of the graft polymers B).

Suitable tetrafluoroethylene polymers E) useable in powder form have particle sizes of, for example, from 100 to 1000 $\mu$m and densities of 2.0 g/cm$^3$ to 2.3 g/cm$^3$.

The use of tetrafluoroethylene polymers above all reduces or completely prevents dripping of the molten molding compound in the event of a fire. In addition, their use in the form of a coagulated mixture improves the surface of moldings produced from the mixtures according to the invention, which is particularly important for the production of moldings of very large surface area and for production at very high processing temperatures.

To produce a coagulated mixture of B) and E), an aqueous emulsion (latex) of a graft polymer B) having average latex particle sizes of from 0.1 to 2 $\mu$m and preferably from 0.2 to 0.6 $\mu$m is first mixed with a finely divided emulsion of a tetrafluoroethylene polymer E) in water having average particle sizes of from 0.05 to 20 $\mu$m and more especially from 0.08 to 10 $\mu$m. Suitable tetrafluoroethylene polymer emulsions normally have solids contents of from 30 to 70% by weight and more especially from 50 to 60% by weight. The emulsions of the graft polymers B) have solids contents of from 25 to 50% by weight and preferably from 30 to 45% by weight.

The ratio by weight of graft polymer B) to tetrafluoroethylene polymer E) in the emulsion mixture is from 95:5 to 60:40. The emulsion mixture is then coagulated in known manner, for example by spray drying, freeze drying or coagulation by addition of inorganic or organic salts, acids, bases or organic water-miscible solvents, such as alcohols, ketones, preferably at temperatures in the range from 20° to 150° C. and more preferably at temperatures in the range from 50° to 100° C. If necessary, the product may be dried at 50° to 200° C. and preferably at 70° to 100° C.

Suitable tetrafluoroethylene polymer emulsions are commercial products and are marketed, for example, by Dupont as Teflon ® 30N.

The thermoplastic molding compounds according to the invention may contain other known additives for polycarbonates, graft polymers or for the thermoplastic polymers, such as stabilizers, pigments, flow aids, mold release agents, fillers and reinforcing materials and/or antistatic agents.

The filled or reinforced molding compounds may contain up to 60% by weight and preferably from 5 to 50% by weight, based on the filled or reinforced molding compound, of fillers and/or reinforcing materials. Suitable reinforcing materials are glass fibers, carbon fibers, aramide fibers, etc. Preferred reinforcing materials are glass fibers. Preferred fillers which may also have a reinforcing effect are glass beads, mica, silicates, quartz, talcum, titanium dioxide, wollastonite.

The molding compounds according to the invention, consisting of components A), B), D) and E) and, optionally, C) and/or optionally other known additives, such as stabilizers, pigments, flow aids, mold release agents, fillers and reinforcing materials and/or antistatic agents are prepared by mixing the respective constituents in known manner and then melt-compounding or melt-extruding the resulting mixture in standard units, such as internal kneaders or single-screw or twin-screw extruders, at temperatures in the range from 200° to 330° C. or by mixing solutions of the respective components in suitable organic solvents, for example in chlorobenzene, and concentrating the mixed solutions by evaporation in standard evaporation units, for example in evaporation extruders.

Accordingly, the present invention also relates to a process for the production of thermoplastic molding compounds consisting of components A), B), D) and E) and, optionally, component C), stabilizers, pigments, flow aids, fillers and reinforcing materials, mold release agents and/or antistatic agents, characterized in that components A), B), D) and E) and, optionally, component C), stabilizers, pigments, flow aids, fillers and reinforcing materials, mold release agents and/or antistatic agents, are mixed and melt-compounded or melt-extruded in conventional units at temperatures in the range from 200° to 330° C., component E) preferably being used in the form of a coagulated mixture with component B).

The individual constituents may be mixed in known manner either gradually or at the same time either at around 20° C. (room temperature) or even at a higher temperature.

The molding compounds according to the present invention may be used for the production of moldings of all kinds. In particular, moldings may be produced by injection molding. Examples of moldings which can be produced from the molding compounds according to the invention include housing components of all kinds, for example for domestic appliances, such as juice presses, coffee machines, mixers, for office machines or cover panels for the building industry and parts for the automotive sector. In addition, they may be used in the field of electrical engineering where they show very good electrical properties.

Another form of processing is the production of moldings by deep drawing from prefabricated sheets or films.

In the context of the invention, particle size always means the average particle diameter $d_{50}$, as determined by ultracentrifuge measurements in accordance with W. Scholtan et. al., Colloids, u. Z. Polymere 250 (1972), pages 782 to 796.

EXAMPLES

1. Components used

A) Polycarbonate of 2,2-bis-(4-hydroxyphenyl)-propane (bisphenol A) having a relative solution viscosity $\eta^{rel}$ of 1.31, as measured in methylene chloride at 23° C. and at a concentration of 0.5% by weight.

B) SAN graft polymer of 50% by weight of a styrene/acrylonitrile mixture (ratio by weight 72:28) on 50% by weight of a particulate polybutadiene having an average particle size ($d_{50}$) of 0.4 μm, obtained by emulsion polymerization.

C) Styrene/acrylonitrile copolymer in which the ratio of styrene to acrylonitrile is 72:28 and which has a viscosity number $[\eta]$ of 0.55 dl/g (as measured in dimethylformamide at 20° C.).

D) Triphenylphosphate

E) Tetrafluoroethylene polymer in the form of a coagulated mixture of an SAN graft polymer emulsion according to B) in water and a tetrafluoroethylene polymer emulsion in water. The ratio by weight of graft polymer B) to the tetrafluoroethylene polymer E) in the mixture is 90% by weight to 10% by weight. The tetrafluoroethylene polymer emulsion has a solids content of 60% by weight; the particle size is between 0.05 and 0.5 μm. The SAN graft polymer emulsion has a solids content of 34% by weight and an average latex particle size of 0.4 μm.

Production of E

The emulsion of the tetrafluoroethylene polymer was mixed with the emulsion of the SAN graft polymer B) and stabilized with 1.8% by weight, based on polymer solids, of phenolic antioxidants. At 85° to 95° C., the mixture was coagulated with an aqueous solution of $MgSO_4$ (Epsom salt) and acetic acid at pH 4 to 5, filtered and washed until substantially free from electrolyte, subsequently freed from most of the water by centrifugation and then dried at 100° C. to form a powder. This powder may then be compounded with the other components in the described units.

2. Production and testing of the molding compounds according to the invention Components A), B), C), D) and E) were compounded in a Werner & Pfleiderer type ZSK 53 twin-screw extruder at a temperature of 240° C.

Moldings were produced in an injection molding machine at a temperature of 260° C.

The fire behavior of the test specimens was measured in accordance with UL-Subj. 94 V in test specimen thicknesses of 1.6 mm. The UL-94 test is carried out as follows:

Material samples are molded into bars measuring 127 × 12.7 × 1.6 mm. The bars are vertically mounted in such a way that the underneath of the test specimen is situated 304 mm above a strip of bandaging material.

Each test bar is individually ignited by two successive ignitions of 10 seconds duration, the burning properties are observed after each ignition and the test specimen is then evaluated. A Bunsen burner having a 10 mm (3.8 inch) tall blue flame of natural gas with a heat content of $3.73 \times 10^4$ kJ/m$^3$ (1000 BUT per cubic foot) is used to ignite the test specimens.

The UL-94 V-0 classification encompasses the properties of materials described in the following which have been subjected to the UL-94 test. The polycarbonate molding compounds in this class contain no test specimens which burn for longer than 10 seconds after each application of the test flame. They do not show a total flame time of more than 50 s during the two flame applications to each test specimen. They contain no test specimens which burn up completely to the retaining clip fastened to the upper end of the test specimen. They contain no test specimens which ignite the wadding arranged beneath the test specimen through burning droplets or particles. They also contain no test specimens which glow for longer than 30 seconds after removal of the test flame.

Other UL-94 classifications apply to specimens which are less flame-retardant and self-extinguishing and which release flaming droplets or particles. These are the UL-94 V-1 and V-2 classifications. F. stands for "failed" and is the classification given to specimens which continue burning for 30 seconds.

Notched impact strength was determined in accordance with DIN 53 453/ISO R 179 using test bars measuring 50×6×4 mm, the test bars being provided with a 2.7 mm deep V-shaped notch.

The oriterion used for stress crazing behavior was the reduction in impact strength (as determined on test bars measuring 50×6×4 mm in accordance with DIN 53 453/ISO R 179) after storage in a simulated fuel bath (mixture of 50% by weight toluene and 50% by weight iso-octane) at room temperature, the test specimens having been pre-extended on a circular template. In the case of materials vulnerable to stress crazing, the values can be expected to be all the more unfavorable, i.e. the deteriorations in the properties can be expected to be greater, the longer the test specimens are stored in the test bath and the greater the pre-extension $\epsilon_x$ (in %). The starting value for non-pre-extended test specimens not exposed to the test bath is n.b. ("not broken") for both Examples. For Example 1 according to the invention (see Table 1 below), a reduction in impact strength n.b. to 90 kJ/m$^2$ is observed after storage for 7 days in the test bath at $\epsilon_x=1\%$, a reduction to 85 kJ/m$^2$ being observed after storage for 30 days at $\epsilon_x=1\%$. By contrast, Comparison Example 2 (Table 2 below) shows a reduction in impact strength n.b. to as low as 15 kJ/m$^2$ after only 7 days' storage in the test bath at $\epsilon_x=0.6\%$, a reduction to 10 kJ/m$^2$ being observed after storage for 30 days under the same conditions. Despite the greater pre-extension $\epsilon_x$, the impact strength of the Example according to the invention is reduced to a far lesser extent than in the case of the Comparison Example. As Table 1 below shows, the molding compounds according to the invention also show distinctly higher notched impact strength for the same flame resistance.

TABLE 1

Composition and properties of the molding compounds

| Example | Components (parts by weight) | | | | | Notched impact strength [kJ/m$^2$] | UL 94 V [1.6 mm] |
|---|---|---|---|---|---|---|---|
| | A | B | C | D | E | | |
| 1 (invention) | 65 | 5 | 15 | 12 | 3 | 10.7 | VO |
| 2 (Comparison) | 65 | — | 20 | 12 | 3 | 3.9 | VO |

We claim:
1. Thermoplastic molding compounds consisting of
A) 50 to 96.5 parts by weight of one or more thermoplastic, halogen-free, aromatic polycarbonates based on diphenols corresponding to

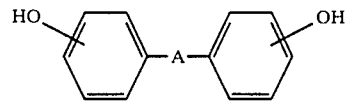

wherein A is a single bond, C$_{1-5}$ alkylene, C$_{2-5}$ alkylidene, C$_{5-6}$ cycloalkylidene, —S— or SO$_2$ B) 3.5 to 25 parts by weight of one or more halogen-free graft polymers of
B.1) 5 to 90 parts by weight, based on B), of a mixture of
B.1.1) 50 to 95% by weight styrene, α-methyl styrene, nucleus-substituted styrene, methyl methacrylate or mixtures thereof and
B.1.2) 50 to 5% by weight (meth)acrylonitrile, methyl methacrylate, n-butyl acrylate, t-butyl (meth)acrylate or mixtures thereof on
B.2) 95 to 10 parts by weight, based on B), of a rubber having a glass temperature T$_G$ of $\leq 10°$ C. selected from the group consisting of butadiene, butadiene/styrene copolymer, polyisoprene, EPDM and silicone rubbers, and C) 0 to 40 parts by weight of a halogen-free, thermoplastic copolymer of
C.1) 50 to 95% by weight styrene, α-methyl styrene, nucleus-substituted styrene, methyl methacrylate or mixtures thereof,
C.2) 50 to 5% by weight (meth)acrylonitrile, methyl methacrylate or mixtures thereof, the sum of the parts by weight of A)+B)+optionally C) having to amount to 100 parts by weight, and D) 1 to 20 parts by weight, based on 100 parts by weight of A)+B)+optionally C), of a halogen-free phosphorus compound corresponding to

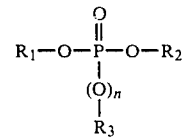

in which R$_1$, R$_2$ and R$_3$ independently of one another represent C$_1$–C$_8$ alkyl or C$_6$–C$_{20}$ aryl and n=0 or 1, and E) 0.05 to 5 parts by weight, based on 100 parts by weight of A)+B)+optionally C), of a tetrafluoroethylene polymer having average particle sizes of 0.05 to 1000 μm, a density of 1.2 to 2.3 g/cm$^3$ a fluorine content of 65 to 76% by weight.

2. Molding compounds as claimed in claim 1, characterized in that component A) is present in quantities of 60 to 96 parts by weight and component B) in quantities of 4 to 15 parts by weight.

3. Molding compounds as claimed in claim 1, characterized in that component A) is present in quantities of 70 to 95.5 parts by weight and component B) in quantities of 4.5 to 10 parts by weight.

4. Molding compounds as claimed in claim 1, characterized in that component C) is present in quantities of 1 to 30 parts by weight.

5. Molding compounds as claimed in claim 4, characterized in that component C) is present in quantities of 5 to 20 parts by weight.

6. Molding compounds as claimed in claim 1, characterized in that component D) is present in quantities of 2 to 15 parts by weight.

7. Molding compounds as claimed in claim 6, characterized in that component D) is present in quantities of 3 to 12 parts by weight.

8. Molding compounds as claimed in claim 1, characterized in that component E) is present in quantities of 0.1 to 1 part by weight.

9. Molding compounds as claimed in claim 8, characterized in that component E) is present in quantities of 0.1 to 0.5 part by weight.

10. Molding compounds as claimed in claim 1, characterized in that component B) is synthesized from 30 to 80 parts by weight B.1 and 70 to 20 parts by weight B.2.

11. Molding compounds as claimed in claim 1 characterized in that component E) is used in the form of a coagulated mixture of emulsions of the tetrafluoroethylene polymers E) having an average particle size of 0.05 to 20 μm and a density of 1.2 to 1.9 g/cm³ with emulsions of graft polymers B), the ratio by weight of graft polymer B) to the tetrafluoroethylene polymer E) is from 95:5 to 60:40 and the content of additional quantities B), based on 100 parts by weight A)+B)+optionally C), is between 0.1 and 4.0 parts by weight.

12. Molding compounds as claimed in claim 1 characterized in that they contain effective quantities of at least one additive selected from the group consisting of stabilizers, pigments, flow aids, fillers and reinforcing materials, mold release agents and/or antistatic agents.

13. Molding compounds as claimed in claim 12, characterized in that they contain as reinforcing materials up to 60% by weight, based on the molding compound to be reinforced, of glass fibers.

14. A process for the production of the molding compounds claimed in claim 1, characterized in that components A), B), D), E) and, optionally, C) are mixed in known manner and the resulting mixture is melt-compounded or melt-extruded in standard units at temperatures in the range from 200° to 330° C.

15. The process of claim 14 characterized in that at least one additive selected from the group consisting of stabilizers, pigments, flow adds, fillers and reinforcing materials, mold release agents and anti-static agents is also incorporated.

16. A thermoplastic molding compound consisting of
A) 50 to 96.5 parts by weight of one or more thermoplastic, halogen-free aromatic polycarbonates based on diphenols corresponding to

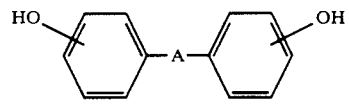

wherein A is a single bond, $C_{1-5}$ alkylene, $C_{2-5}$ alkylidene, $C_{5-6}$ cycloalkylidene, —S— or —SO$_2$ B) 4.5 to 10 parts by weight of one or more halogen-free graft polymers of
  B.1) 5 to 90 parts by weight, based on B), of a mixture of
    B.1.1) 50 to 95% by weight styrene, α-methyl styrene, nucleus-substituted styrene, methyl methacrylate or mixtures thereof and
    B.1.2) 50 to 5% by weight (meth)acrylonitrile, methyl methacrylate, n-butyl acrylate, t-butyl (meth)acrylate or mixtures thereof on
  B.2) 95 to 10 parts by weight, based on B), of a rubber having a glass temperature $T_g$ of $\leq 10°$ C. selected from the group consisting of butadiene, butadiene/styrene copolymer, polyisoprene, EPDM and silicone rubbers, and
C) 0 to 40 parts by weight of a halogen-free, thermoplastic copolymer of
  C1) 50 to 95% by weight styrene, α-methyl styrene, nucleus-substituted styrene, methyl methacrylate or mixtures thereof, and
  C2) 50 to 5% by weight (meth)acrylonitrile, methyl methacrylate or mixtures thereof,
the sum of the parts by weight of A)+B)+optionally C) having to amount to 100 parts by weight, and
D) 1 to 20 parts by weight, based on 100 parts by weight of A)+B)+optionally C), of a halogen-free phosphorus compound corresponding to

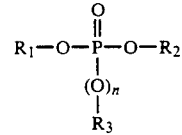

in which R$_1$, R$_2$ and R$_3$ independently of one another represent C$_1$-C$_8$ alkyl or C$_6$-C$_{20}$ aryl and n=0 or 1, and
E) 0.05 to 5 parts by weight, based on 100 parts by weight of A)+B)+optionally C), of a tetrafluoroethylene polymer having average particle sizes of 0.05 to 1000 μm, a density of 1.2 to 2.3 g/cm³ and a fluorine content of 65 to 76% by weight.

17. A thermoplastic molding compound consisting of
A) 60 to 96 parts by weight of one or more thermoplastic, halogen-free aromatic polycarbonates based on diphenols corresponding to

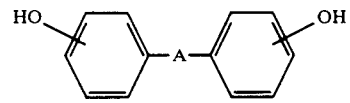

wherein A is a single bond, $C_{1-5}$ alkylene, $C_{2-5}$ alkylidene, $C_{5-6}$ cycloalkylidene, —S— or SO$_2$
B) 4.0 to 15 parts by weight, of one or more halogen-free graft polymers of
  B.1) 5 to 90 parts by weight, based on B), of a mixture of B.1.1.) 50 to 95% by weight styrene, α-methyl styrene, nucleus-substituted styrene, methyl methacrylate or mixture thereof and B.1.2) 50 to 5% by weight (meth)acrylonitrile, methyl methacrylate, n-butyl acrylate, t-butyl (meth) acrylate or mixtures thereof on B.2) 95 to 10 parts by weight, based on B), of a rubber having a glass temperature $T_g$ of $\leq 10°$ C. selected from the group consisting of butadiene, butadiene/styrene copolymer, polyisoprene, EPDM and silicone rubbers, and C) 0 to 40 parts by weight of a halogen-free, thermoplastic copolymer of C.1) 50 to 95% by weight styrene, α-methyl styrene, nucleus-substituted styrene, methyl methacrylate or mixtures thereof, and C.2) 50 to 5% by weight (meth)acrylonitrile, methyl methacrylate or mixtures thereof, the sum of the parts by weight of A)+B)+optionally C) having to amount to 100 parts by weight, and D) 1 to 20 parts by weight, based on 100 parts by weight of A)+B)+optionally B), of a halogen-free phosphorus compound corresponding to

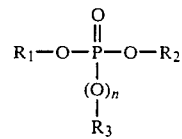

in which $R_1$, $R_2$ and $R_3$ independently of one another represent $C_1$-$C_8$ alkyl or $C_6$-$C_{20}$ aryl and n=0 to 1, E) 0.05 to 5 parts by weight, based on 100 parts by weight of A)+B)+optionally C), of a tetrafluoroethylene polymer having average particle sizes of 0.05 to 1000 μm, a density of 1.2 to 2.3 g/cm³ and a fluorine content of 65 to 76% by weight.

18. The compound of claim 1 wherein said rubber is butadiene or butadiene/styrene copolymer.

19. The compound of claim 16 wherein said rubber is butadiene or butadiene/styrene copolymer.

20. The compound of claim 17 wherein said rubber is butadiene or butadiene/styrene copolymer.

* * * * *